(12) United States Patent
Henry et al.

(10) Patent No.: US 10,173,279 B2
(45) Date of Patent: Jan. 8, 2019

(54) WELDING SYSTEM

(71) Applicant: LINCOLN GLOBAL, INC., City of Industry, CA (US)

(72) Inventors: Judah Benjamin Henry, Geneva, OH (US); Daniel P. Fleming, Painesville, OH (US); William T. Matthews, Chesterland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 598 days.

(21) Appl. No.: 14/550,227

(22) Filed: Nov. 21, 2014

(65) Prior Publication Data
US 2016/0144443 A1  May 26, 2016

(51) Int. Cl.
 B23K 9/10 (2006.01)
 B23K 9/08 (2006.01)
 B23K 9/09 (2006.01)

(52) U.S. Cl.
 CPC . B23K 9/08 (2013.01); B23K 9/09 (2013.01)

(58) Field of Classification Search
 CPC .......... B23K 9/09; B23K 9/08; B23K 9/0956; B23K 9/291; B23K 9/1062; B23K 9/1087; B23K 9/1006; B23K 9/1068; B23K 9/1056; B23K 9/092
 USPC ........ 219/130.21, 130.51, 130.5, 132, 130.1, 219/130.31, 130.32, 130.33, 137 PS
 See application file for complete search history.

(56) References Cited

U.S. PATENT DOCUMENTS

| | | | | |
|---|---|---|---|---|
| 3,626,145 A | * | 12/1971 | Jackson | B23K 9/0737 219/123 |
| 4,336,441 A | | 6/1982 | Godai et al. | |
| 4,341,944 A | | 7/1982 | Breen | |
| 4,348,578 A | * | 9/1982 | Masaki | B23K 9/0956 219/130.01 |
| 4,409,465 A | | 10/1983 | Yamamoto | |
| 4,571,479 A | * | 2/1986 | Maeda | B23K 9/1276 219/124.34 |
| 5,278,390 A | * | 1/1994 | Blankenship | B23K 9/0953 219/125.1 |

(Continued)

FOREIGN PATENT DOCUMENTS

| | | |
|---|---|---|
| JP | 03106567 | 5/1991 |
| JP | 0623551 | 2/1994 |
| KR | 100726575 | 6/2007 |

OTHER PUBLICATIONS

Arc Blow: Problem Solver; Diverse Zeromag(tm); 2 pages; www.diverse-technologies.net/pages/absolver.html; Jun. 25, 2014.

(Continued)

*Primary Examiner* — Dana Ross
*Assistant Examiner* — Ayub Maye (57) ABSTRACT

The invention described herein generally pertains to a system and method related to reducing magnetic arc blow during a welding operation performed by a welding system. In accordance with one embodiment of the invention, a welding system including a waveform generator generates a waveform that is switched from a positive current to a negative current, while passing through zero, in a step-wise fashion to resist the magnetic field within the material (e.g., the workpiece). In accordance of another embodiment of the invention, the welding system includes a nickel flux cord welding wire.

18 Claims, 6 Drawing Sheets

(56) References Cited

U.S. PATENT DOCUMENTS

| | | | | |
|---|---|---|---|---|
| 5,317,116 | A * | 5/1994 | Tabata | B23K 9/0734 219/130.31 |
| 5,416,299 | A | 5/1995 | Tabata | |
| 5,495,091 | A | 2/1996 | Tabata | |
| 6,207,929 | B1 * | 3/2001 | Stava | B23K 9/092 219/130.51 |
| 6,472,634 | B1 * | 10/2002 | Houston | B23K 9/0953 219/130.5 |
| 6,498,321 | B1 | 12/2002 | Fulmer et al. | |
| 6,717,107 | B1 | 4/2004 | Hsu | |
| 6,930,279 | B2 | 8/2005 | Myers | |
| 7,282,668 | B2 | 10/2007 | Houston | |
| 7,989,732 | B2 | 8/2011 | Karogal et al. | |
| 2006/0070983 | A1 | 4/2006 | Narayanan | |
| 2009/0120919 | A1 | 5/2009 | O'Donnell | |
| 2010/0308019 | A1 | 12/2010 | Bong | |
| 2010/0326963 | A1 * | 12/2010 | Peters | B23K 9/122 219/76.14 |
| 2012/0074115 | A1 | 3/2012 | Kazmaier | |
| 2012/0298643 | A1 | 11/2012 | Lambert et al. | |
| 2013/0200054 | A1 | 8/2013 | O'Donnell | |
| 2013/0228555 | A1 | 9/2013 | Peters | |
| 2013/0228558 | A1 * | 9/2013 | Daniel | B23K 9/025 219/130.21 |
| 2013/0256288 | A1 | 10/2013 | Matthews et al. | |
| 2013/0327748 | A1 | 12/2013 | Salsich et al. | |
| 2014/0042139 | A1 | 2/2014 | Stava et al. | |
| 2014/0131331 | A1 | 5/2014 | Koprivnak et al. | |
| 2014/0138364 | A1 | 5/2014 | Aberg | |
| 2016/0067808 | A1 * | 3/2016 | Peters | B23K 9/092 219/130.51 |
| 2016/0082538 | A1 * | 3/2016 | Peters | B23K 9/0286 219/74 |
| 2016/0082539 | A1 * | 3/2016 | Flagg | B23K 9/0737 219/130.51 |

OTHER PUBLICATIONS

John Talkington; Variable Polarity Gas Metal Arc Welding; A Thesis presented in partial fulfillment of the requirements for the Degree Master of Science in the Graduate School of the Ohio State University, 1998. 126 pgs.

* cited by examiner

WELDING SYSTEM

TECHNICAL FIELD

In general, the present invention relates to a welding system. More particularly, the present invention relates to a welding system having an alternating current waveform generator that switches a welding arc from positive current to negative current in a step-wise fashion when the arc is operated in the presence of a magnetic field emanating from the workpiece.

BACKGROUND OF THE INVENTION

Steel products having high nickel content may generate a magnetic field that causes the welding arc to wander or cause arc blow. The magnetic field may be attributed to the material or magnetic fields built up within the material. For example, when magnetic cranes are used to move steel work pieces having high nickel content, a magnetic field may be imparted to the work piece from the crane. For example, cryogenic tanks may include components constructed of steel with high nickel content and moved with magnetic cranes, it was observed that arc blow occurred at the ends of the tank.

SUMMARY OF THE INVENTION

In accordance with an embodiment of the present invention, a welder system is provided that includes a welding power supply which provides an alternating current welding waveform that transitions through zero to an electrode to create an arc between the electrode and a workpiece and a waveform generator that is configured to create the alternating current welding waveform with a first portion and a second portion in a cycle, wherein the first portion includes a duration of time in a positive polarity and the second portion includes a duration of time in a negative polarity. The welding system can further include a high speed diverter component that is configured to transition the alternating current welding waveform from the positive polarity to the negative polarity based upon maintaining a ratio between the duration of time in the positive polarity and the duration of time in the negative polarity and a detection component that is configured to detect a magnetic field in the workpiece related to arc blow resultant of the waveform portion providing a heat input during welding. The welding system further includes a controller that is configured to utilize the alternating current welding waveform with the ratio during welding to reduce the magnetic field detected.

In accordance with an embodiment of the present invention, a method is provided that includes at least the steps of: creating an arc between an electrode and a workpiece; delivering a welding wire to a puddle formed by the electrode; generating a waveform with a time ratio in which a duration of time in a positive polarity is equal to or greater than a duration of time in a negative polarity; and reducing a magnetic field due to arc blow on the workpiece with the waveform.

In accordance with an embodiment of the present invention, a welder system is provided that includes at least the following: a welding power supply which provides an alternating current welding waveform to an electrode to create an arc between the electrode and a workpiece; a welding power supply which provides an alternating current welding waveform that transitions through zero to an electrode to create an arc between the electrode and a workpiece; means for creating the alternating current welding waveform with a first portion and a second portion in a cycle, wherein the first portion includes a duration of time in a positive polarity and the second portion includes a duration of time in a negative polarity; means for transitioning the alternating current welding waveform from the positive polarity to the negative polarity based upon maintaining a ratio between the duration of time in the positive polarity and the duration of time in the negative polarity; means for detecting a magnetic field in the workpiece related to arc blow resultant of the waveform portion providing a heat input during welding; and a controller that is configured to utilize the alternating current welding waveform with the ratio during welding to reduce the magnetic field detected.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1 and 4 (among others) illustrates a welding system that is used with an automated or semi-automated welding system.

Embodiments of the invention relate to methods and systems that relate to reducing magnetic arc blow during a welding operation performed by a welding system. In accordance with one embodiment of the invention, a welding system including a waveform generator generates a waveform that is switched from a positive current to a negative current, while passing through zero, in a step-wise fashion to resist the magnetic field within the material (e.g., the workpiece). In accordance of another embodiment of the invention, the welding system includes a nickel flux cord welding wire. In accordance with another embodiment of the invention, the time ratio of the positive portion of the waveform to the negative portion of the waveform, for a cycle, is within the range of 50/50 percent to 90/10 percent. In accordance with another embodiment of the invention, the ratio of positive time to negative time for the waveform is 80/20 percent. In yet another embodiment, the welding system may include an input device allowing selection of a selected ratio within the range of 50/50 through 90/10 positive to negative ratio. In accordance with another embodiment, the input device is used to select from a plurality of pre-selected ratios for the waveform (e.g., waveforms having positive to negative current ratios, waveforms having positive to negative voltage ratios, etc.). In accordance with another embodiment of the invention, switching the polarity of the arc occurs at a relatively high frequency, wherein a high frequency is above 80 Hz. In accordance with another embodiment of the subject innovation, the polarity of the arc can be switched at a frequency within a range of about 90 Hz to 115 Hz.

In accordance with another embodiment of the invention, a detection component is used to detect the presence of a magnetic field in the workpiece. In accordance with another embodiment of the invention, upon detecting a magnetic field, the welding system switches into an alternative alternating current welding mode that incorporates a polarity switching waveform where the arc formed is switched from a positive current to a negative current in a step-wise fashion at a selected ratio of positive to negative current. According to another embodiment of the invention, the welding system may include an input component that permits the user to select the alternative alternating current welding mode.

"Welding" or "weld" as used herein including any other formatives of these words will refer to depositing of molten material through the operation of an electric arc including but not limited to gas shielded flux cored arc welding (G-FCAW), submerged arc, GTAW, GMAW, MAG, MIG, TIG welding, or any electric arc used with a welding system. Moreover, the welding operation can be on a workpiece that includes a coating such as, but not limited to, a galvanized coating.

Magnetic arc blow can be caused by a magnetic field inherent in the work piece W. The work piece being any material that is to be welded. Excessive magnetic arc blow can result in defects within the weld and slow down production.

Magnetic arc blow, or simply arc blow, refers to an unbalanced magnetic field surrounding the welding arc leading to an unstable welding arc. Arc blow can be caused by residual magnetism in steel products. Iron and some other elements found within work pieces are ferromagnetic. Considering the work piece at a microscopic scale, individual magnetic sections are formed within the grains of ferromagnetic material. In a demagnetized state, these magnetic sections may be randomly aligned such that the magnetic field generated by the work piece is relatively weak or neutral due to the cancelling effect of the random orientation of the magnetic fields. When magnetized, however, these magnetic sections may be reoriented and aligned to the point that the level of residual magnetism becomes significant enough to influence a welding process. Reorientation or alignment of the magnetic sections may be caused by several external factors including mechanical factors such as bending, grinding, machining, shock, vibration; storage conditions such as close proximity of steels where one is magnetized; and external magnetic fields, such as magnetic lifting equipment and overhead lines of railways. These factors are not limiting.

Work pieces having high nickel content such as nickel steel alloys are magnetized relatively easily and are thus more susceptible to the negative effects of magnetic arc blow. For example, as discussed more completely below, 9 percent nickel steel is the base material used to construct cryogenic storage tanks for liquid natural gas. The components used to form these tanks are often moved or transported using magnetic cranes. When welding these tanks, arc blow tends to occur at the ends of the tank due to residual magnetic fields within the work piece material. Thus, in an embodiment, a workpiece as described in the subject innovation can contain nickel, and in particular, be approximately a 9% nickel steel.

Figure 1:
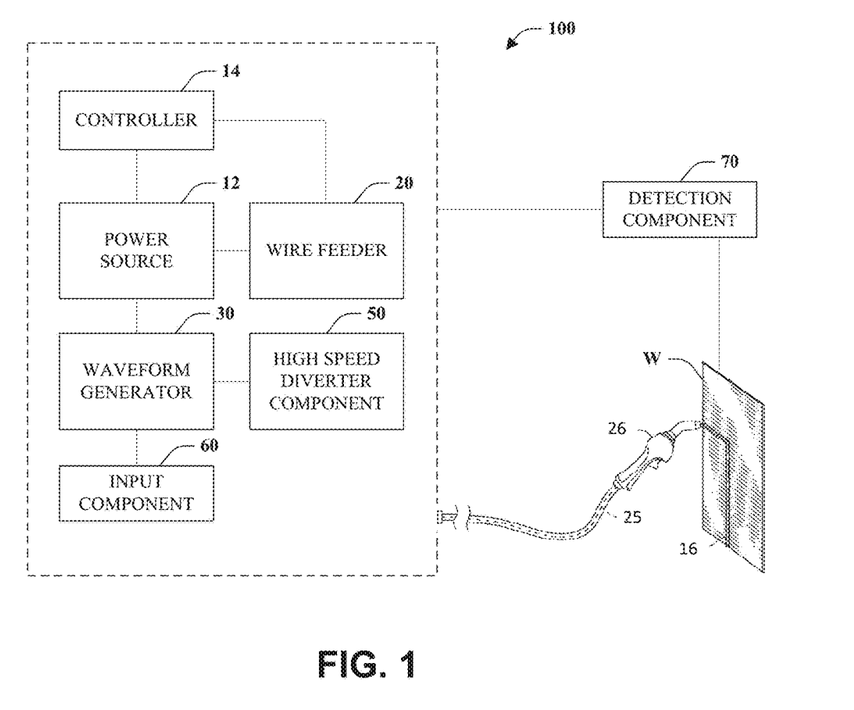
FIG. 1 is a diagram that illustrates a welding system in accordance with the subject innovation.

In accordance with the present invention, a welding system, generally indicated by 100 is illustrated in FIG. 1. Welding system 100 includes a controller 14 that is configured to perform a welding operation on a workpiece W to create a weld 16. System 100 includes torch 26 having an electrode in which power source 12 creates arc between electrode and workpiece W to complete an electrical circuit to perform the welding operation. System 100 can include power source 12 that is configured to create arc between an electrode and workpiece W, wherein wire feeder 20 is configured to deliver welding wire to a puddle formed by the electrode. Controller 14 can be configured to manage wire feed speed (WFS) of wire feeder 20, power source 12 that creates arc, waveform generator 30 that creates and/or outputs a waveform for the welding operation, high speed diverter component 50 that manages a switch of polarity between positive and negative for a waveform, and/or input component 60 that receives an input related to the welding operation such as, but not limited to, a time ratio for a portion of positive waveform to a portion of negative waveform in which the waveform is a square wave.

The welding system 100 can include a power source 12 that provides a constant voltage welding process in an alternating current (AC) mode such that when transitioning from a positive current to a negative current, the current transitions through zero. The welding system 10 includes a wire feeder 20 that delivers wire such as, but not limited to, a flux cord welding wire 25 to a torch 26. Flux cord wire 25 includes a nickel base flux 26. One example of a suitable wire is Lincoln Electric's Supercore 625P flux cord welding wire (AWS A5.34 ENiCrMo3T1-4). The welding system 100 further includes a waveform generator 30. Welding system 100 further includes a high speed diverter component 50. Using the high speed diverter component 50, waveform generator 30 is able to produce a square wave having a constant current that is switched between positive and negative polarity, while passing through zero, to reduce the residual magnetism found in the workpiece W.

In general, the ratio of positive polarity to negative polarity is greater than or equal to 50/50. A range of 50/50 to 90/10 produced suitable results in reducing the effect of the residual magnetism in the workpiece W. Ratios where the portion of negative polarity was less than the portion of positive polarity were used including ratios of 80/20 and 90/10 positive polarity to negative polarity. As the ratio approaches a 50/50 ratio, the magnetism within the work piece is resisted to a greater extent. As the ratio approached 50/50 greater spatter generation occurred. Therefore, depending on the level of magnetism residing within the workpiece W, it is desirable to reduce the period of negative polarity to avoid excessive spatter. To that end, welding system 10 may include an input component 60 that allows the user to adjust the positive to negative ratio. In another embodiment, the input component 60 can include continuous adjustment of the ratio or a plurality of pre-selected ratios. Alternatively, variation of the ratio may be performed automatically by the waveform generator 30 based on feedback from a detection component 70. For instance, the detection component 70 can be a magnetic field sensor coupled to the workpiece W. In another example, a gauss sensor can be used to detect the presence of the magnetic field and/or field strength.

Welder system 100 can further include detection component 70 that is configured to measure a magnetic field buildup due to arc blow. Based on the magnetic field buildup measured by detection component 70, waveform generator 30 and/or high speed diverter component 50 can be configured to output a waveform with a positive polarity and a negative polarity that alleviates the magnetic field buildup due to arc blow. In particular, the waveform can be a square wave in which a duration of time in a positive current compared to a duration of time in a negative current can be a ratio of at least 50/50. In another embodiment, the ratio of the duration of time in a positive current compared to the duration of time in a negative current can be greater for the positive current in order to reduce the magnetic field buildup due to arc blow. Thus, utilizing the waveform with such ratio of positive current to negative current for the welding operation on workpiece W counteracts arc blow.

It is to be appreciated that detection component 70 can be configured to approximate an amount of magnetic field buildup rather than specifically detect an amount of magnetic field buildup for the welding operation based on one or more welding parameters. For instance, based on an approximation of magnetic field buildup in workpiece W, waveform generator 30 and/or high speed diverter component 50 can be configured to output a waveform with a positive polarity and a negative polarity that alleviates the magnetic field buildup due to arc blow. The approximation of an amount of magnetic field buildup can be performed by a technique selected by sound engineering judgment or by one having ordinary skill without departing from the subject innovation. By way of example and not limitation, the approximation of magnetic field buildup by detection component 70 can be based on a duration of time welding, a type of welding operation, a location of the welding operation is performed on the workpiece, a type of material of workpiece W, a wire feed speed, a type of welding wire, a waveform used to create an arc, among others.

In another embodiment, detection component 70 can be configured to ascertain a location on workpiece W or a duration of time performing the welding operation on workpiece W in which either is indicative of having a buildup of magnetic field due to arc blow. For example, detection component 70 can detect a length of the weld 16 or a duration of time welding on workpiece W and waveform generator 30 and/or high speed diverter component 50 can be configured to output a waveform with a positive polarity and a negative polarity that alleviates the magnetic field buildup due to arc blow.

Flux cord wire 25 includes a nickel base flux 26. One example of a suitable wire is Lincoln Electric's Supercore 625P flux cord welding wire (AWS A5.34 ENiCrMo3T1-4). For instance, the following, TABLE 1, can be utilized with the subject innovation:

TABLE 1

| ELEMENT | AWS RANGE | EN ISO RANGE | TYPICAL |
| --- | --- | --- | --- |
| C | 0.10 | 0.10 | 0.020 |
| Mn | 0.50 | 0.50 | 0.30 |
| Si | 0.50 | 0.5 | 0.20 |

TABLE 1-continued

| ELEMENT | AWS RANGE | EN ISO RANGE | TYPICAL |
| --- | --- | --- | --- |
| Cr | 20.0-23.0 | 20.0-23.0 | 20.5 |
| Ni | 58.0 min. | 58.0 min. | 66.0 |
| Mo | 8.0-10.0 | 8.0-10.0 | 8.2 |
| Nb + Ta | 3.15-4.15 | 3.15-4.15 | 3.30 |
| Ti | 0.40 | 0.40 | 0.18 |
| Fe | 5.0 | 5.0 | 1.0 |
| Cu | 0.50 | 0.5 | 0.016 |

In another embodiment, LNS NiCro 60/20—LNS NiCroMo 60/16 (P2007)—NYLOID 2—Supercore 625 can be utilized. In still another embodiment, ULTRAMET 308LCF—M/T/SER308LCF—SUPERCORE 308LCF can be utilized.

Figure 2:
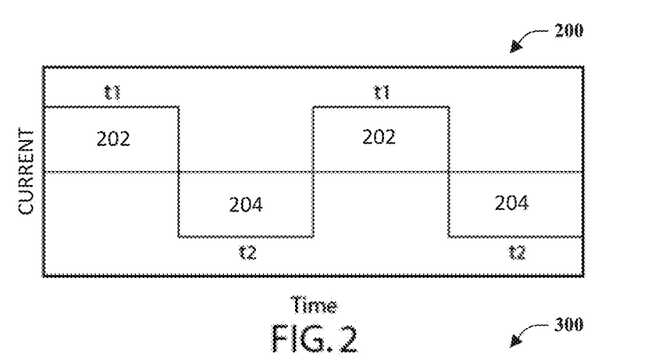
FIG. 2 is a diagram that illustrates a graph of a waveform in accordance with the subject innovation.

FIG. 2 illustrates a graph 200 of a waveform in accordance with the subject innovation. By way of example and not limitation, the waveform can be a square wave. Yet, it is to be appreciated that a waveform can be selected by sound engineering judgment and/or by one of ordinary skill in the art so long as the ratio of a positive portion to negative portion of the waveform is in a range of 50/50 to 90/10. Moreover, the ratio of a duration of time for a positive portion of a waveform to a duration of time for a negative portion, for a cycle, can be selected so long as the duration of time for the positive portion of the waveform is equal to or greater than the duration of time for the negative portion.

The graph 200 illustrates the waveform in two cycles. For the sake of brevity, a single cycle will be discussed. The waveform can include a first portion 202 for a duration of time (t1) within a positive current and a second portion 204 for a duration of time (t2) in a negative current. By configuring the ratio of t1 to t2 in which t1 is equal to or greater than t2, arc blow can be reduced in a welding procedure on a workpiece, wherein the workpiece can be, for instance, steel containing nickel. In another embodiment, the frequency of each cycle can be configured to correspond to an amount of buildup of magnetic field due to arc blow in order to reduce such arc blow.

Figure 3:
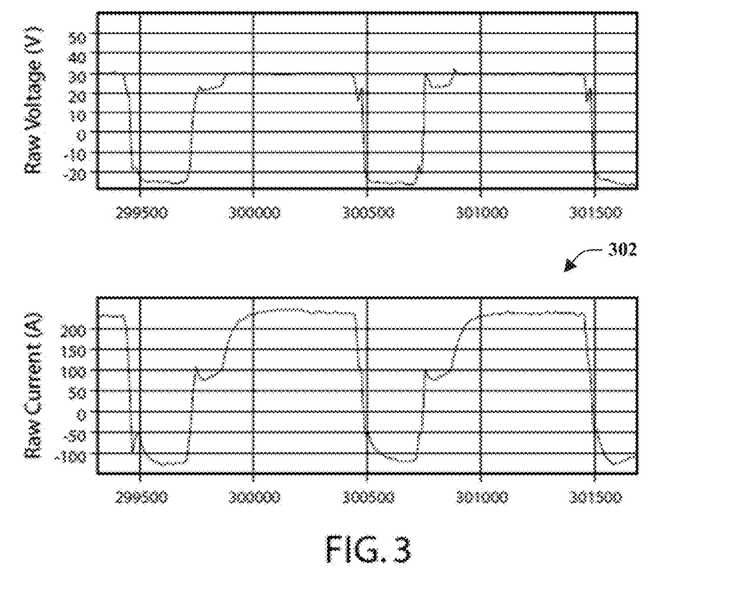
FIG. 3 is a diagram that illustrates a graph of a waveform in accordance with the subject innovation.

FIG. 3 illustrates a first graph 300 and a second graph 302 in accordance with the subject innovation. The first graph 300 illustrates a waveform having a duration of time in a positive raw voltage and a duration of time in a negative raw voltage for a cycle. Similarly, the second graph 302 illustrates a waveform having a duration of time in a positive raw current and a duration of time in a negative raw current for a cycle. The first graph 300 and the second graph 302 are utilized to illustrate the reduction of magnetic field build up due to arc blow.

Figure 4:
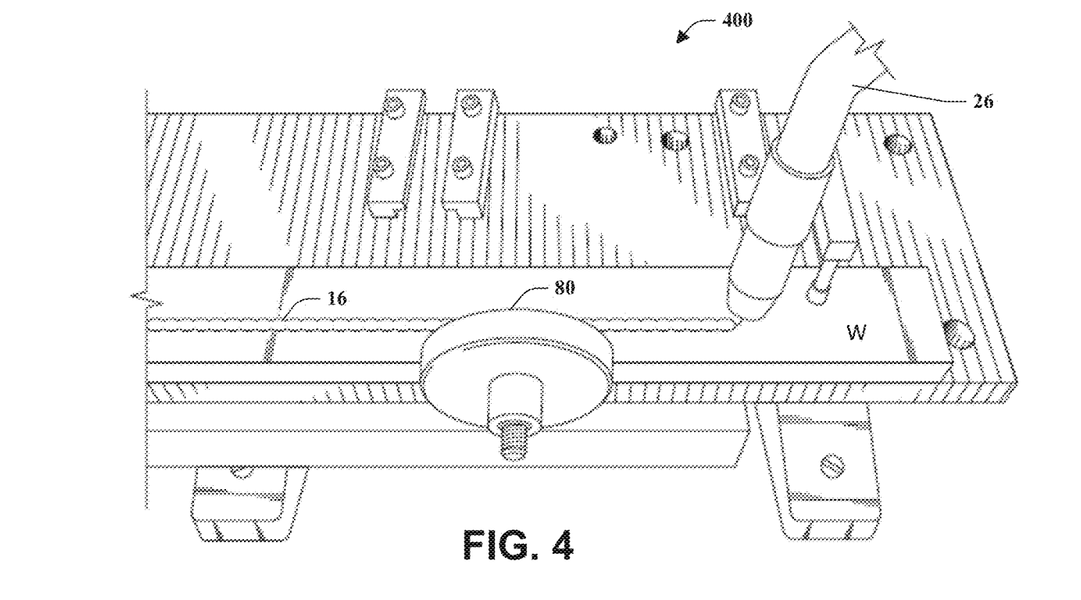
FIG. 4 is a diagram that illustrates a welding system in accordance with the subject innovation.
Figure 5:
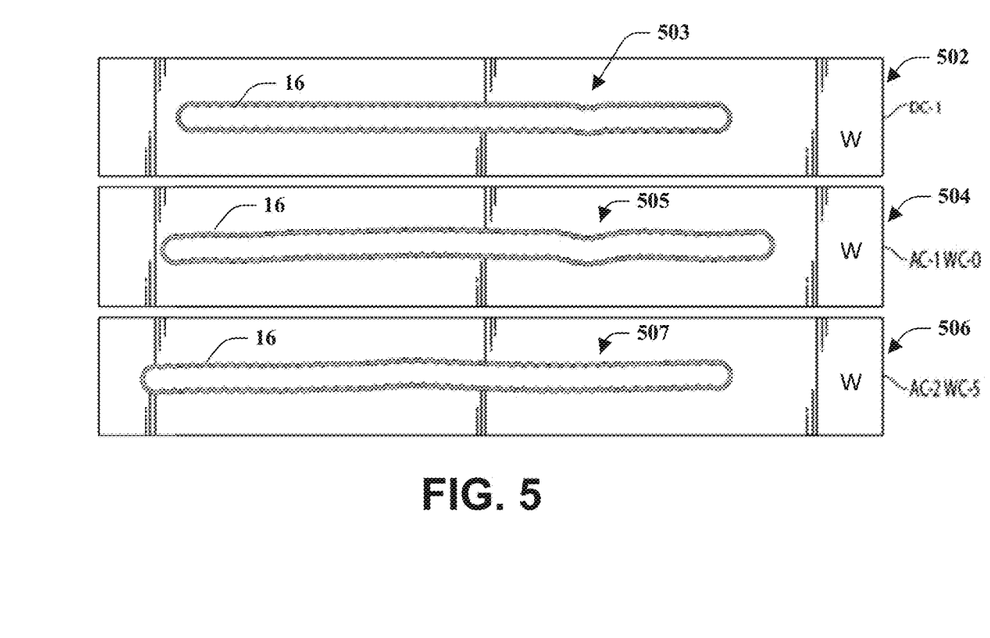
FIG. 5 is a diagram that illustrates welds performed with a welding system in accordance with the subject innovation.

FIG. 4 illustrates a welding system 400 that includes the torch 26 that create the weld 16 on the workpiece W, and a magnet 80 to replicate a buildup of magnetic field related to arc blow. The welds 16 that were created while passing the magnet 80 are illustrated in FIG. 5 in a pass 502, a pass 504, and a pass 506, wherein each pass utilized a specific waveform. For instance, a first waveform (DC1, conventional DC waveform) was used in which the pass 502 illustrated a dip 503 in the weld 16 on workpiece W. In another instance, a second waveform (AC-1WC-0, conventional AC waveform) was used in which the pass 504 illustrated a dip 505 in the weld 16. However, when employing a waveform as discussed herein (e.g., having at least a 50/50 ratio of a duration of time in a positive current to a duration of time in a negative current), referenced by AC-2WC-5, the pass 506 illustrated no dip at 507 in the weld 16 on the workpiece W since the waveform reduced the magnetic field generated by the magnet 80 which is replicating a magnetic field due to arc blow.

Figure 6:
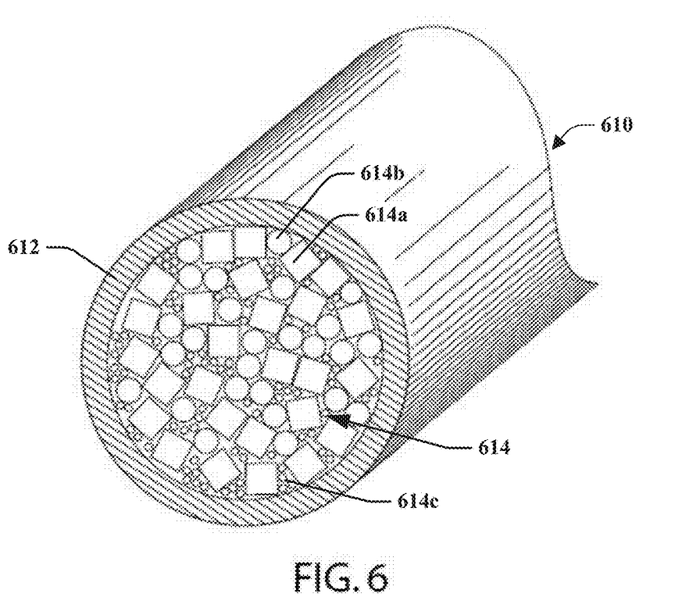
FIG. 6 is a diagram that illustrates a flux cored electrode in accordance with the subject innovation.

The welding system of the subject innovatin can utilize a cored electrode such as electrode 610 shown in FIG. 6. As described above, a welder has torch for directing electrode toward workpiece W. An arc is created between the end of electrode and workpiece W. The electrode is a cored electrode with sheath 612 and internal filled core 614. The core includes flux ingredients, such as represented by particles 614a. The purpose of these ingredients 614a is to (a) shield the molten weld metal from atmospheric contamination by covering the molten metal with slag, (b) combine chemically with any atmospheric contaminants such that their negative impact on the weld quality is minimized and/or (c) generate arc shielding gases. In accordance with standard practice, core 614 also includes alloying ingredients, referred to as particles 614b, together with other miscellaneous particles 614c that are combined to provide the fill of core 614. To optimize the welding operation, it has been necessary to use solid wire with an external shielding gas. However, in order to produce a weld with specific mechanical and metallurgical properties, specific alloys are required, which can be difficult to obtain in the form of a solid wire. Contamination is difficult to prevent when using a welding process requiring external shielding gas. It would be advantageous to therefore use a self-shielding cored electrode, so that the environment does not affect the welding. Cored electrodes experience different burn back rates for the sheath and core. All of these difficulties have resulted in most pipeline welding to be done with a solid wire and external shielding gas. For instance, the electrode 610 can be a nickel based flux. Moreover, the internal filled core 614 can include a portion of nickel. In still another embodiment, the sheath 612 can include, for instance, a nickel alloy.

In an embodiment, the detection component is further configured to identify the magnetic field buildup due to arc blow in the workpiece at a level and the high speed diverter component is further configured to transition the alternating current waveform from the positive polarity to the negative polarity based on the identification of the level. In an embodiment, the alternating current welding waveform is a square waveform having an amplitude and a frequency or a pulse waveform having an amplitude and a frequency.

In an embodiment, the duration of time in the positive polarity for the first portion of the alternating current welding waveform is greater than or equal to the duration of time in the negative polarity for the second portion of the alternating current welding waveform. In an embodiment, the ratio between the duration of time in the positive polarity for the first portion to the duration of time in the negative polarity for the second portion is 50/50. In an embodiment, the ratio between the duration of time in the positive polarity for the first portion to the duration of time in the negative polarity for the second portion is at least one of 60/40, 70/30, 80/20, or 90/10.

In an embodiment, the controller is further configured to dynamically adjust at least one of the first portion, the second portion, an amplitude of the alternating current welding waveform, a frequency of the alternating current welding waveform, the ratio, the duration of time in the positive polarity for the first portion, or the duration of time in the negative polarity for the second portion to mitigate the magnetic field. In an embodiment, the alternating current welding waveform includes a frequency within a range of 90 Hz to 115 Hz. In an embodiment, the controller adjusts the frequency based upon at least one of a voltage or a current of the alternating current welding waveform.

In an embodiment, the high speed converter component is further configured to transition the alternating current welding waveform from the positive polarity to the negative polarity based upon a duration of time during welding which negates the amount of the magnetic field that builds up during the duration of time. In an embodiment, the high speed converter component is further configured to transition the alternating current welding waveform from the positive polarity to the negative polarity based upon a length of a weld during welding which negates the amount of the magnetic field that builds up during the length of the weld.

In an embodiment, the subject innovation can further include: the detection component is further configured to calculate an estimated amount of magnetic field buildup related to arc blow in which the estimated amount is calculated upon a material of the workpiece, a type of welding operation, a duration of time a weld is created, a length of performing a weld on the workpiece, and a type of electrode; and the controller that is further configured to utilize the alternating current welding waveform with the ratio during welding to reduce the estimated amount of magnetic field buildup related to arc blow. In an embodiment, the controller is further configured to adjust a current or a voltage of the alternating current welding waveform or a duration of time the current or the voltage is delivered for the alternating current welding waveform to reduce the magnetic field. In an embodiment, the electrode is a flux cored electrode including at least a nickel alloy.

Figure 7:
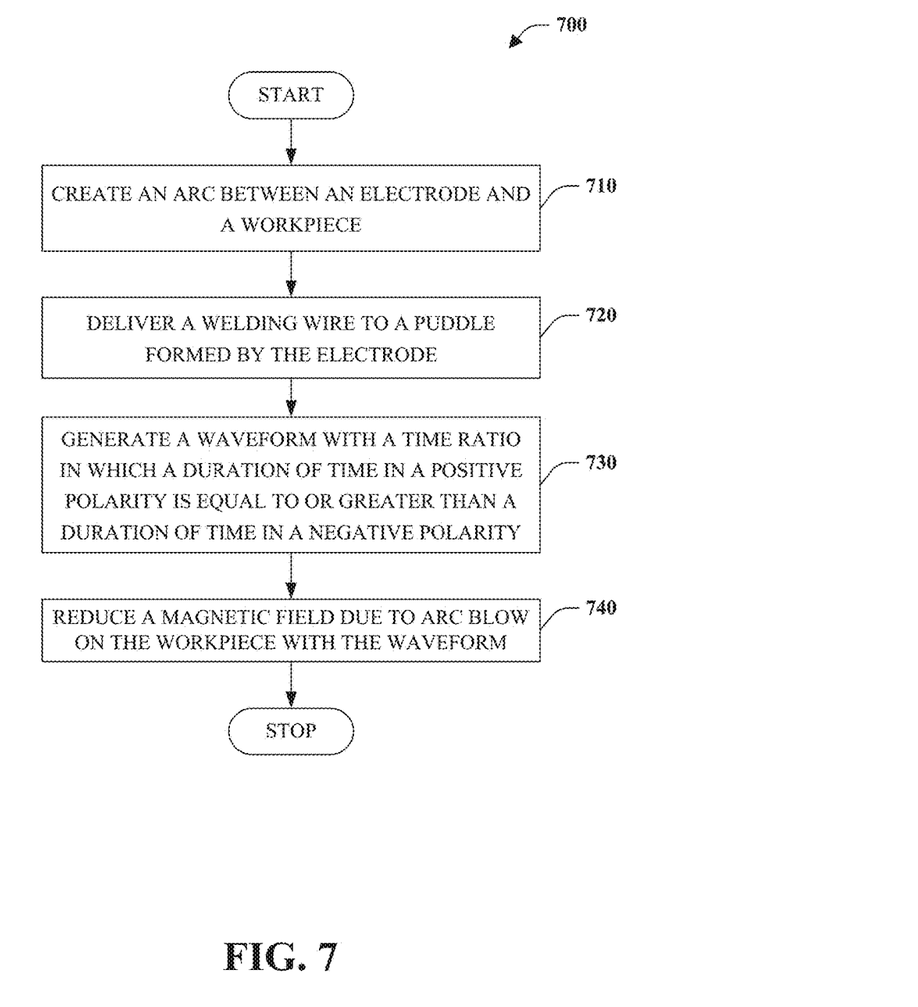
FIG. 7 is a diagram that illustrates a flow diagram for a welding system in accordance with the subject innovation.

In view of the exemplary devices and elements described supra, methodologies that may be implemented in accordance with the disclosed subject matter will be better appreciated with reference to the flow chart and/or methodology of FIG. 7. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 700 of FIG. 7 which is a flow diagram 700 that reduces a magnetic field due to arc blow during a welding operation. At reference block 710, an arc can be created between an electrode and a workpiece. At reference block 720, a welding wire can be delivered to a puddle formed by the electrode. At reference block 730 a waveform, with a time ratio in which a duration of time in a positive polarity is equal to or greater than a duration of time in a negative polarity, can be created. At reference block 740, a magnetic field can be reduced due to arc blow on the workpiece with the waveform.

In an embodiment, the electrode is a flux cored electrode including at least a nickel alloy. In an embodiment, the waveform is a square waveform having an amplitude and a frequency or a pulse waveform having an amplitude and a frequency. In an embodiment, the waveform includes a frequency within a range of 90 Hz to 115 Hz. In an embodiment, the method can further include adjusting the time ratio based upon a welding parameter, a duration of time when creating the arc, a length on the workpiece the arc travels, or an amount of the magnetic field.

Generally, the welding parameter can be, but is not limited to being, a welding parameter that affects the welding operation. Yet, it is to be appreciated that the welding parameter can be, but is not limited to being, an arc voltage, a travel speed of the torch 26 that performs the welding operation, an amplitude of the waveform, a current of the waveform, a voltage of the waveform, a frequency of the waveform, a wire feed speed, an arc current level, a height of the torch 26, a distance between workpiece W and torch 26, an oscillation width of electrode, a temperature of welding wire, a temperature of electrode, a type of material of workpiece W, a frequency of oscillation of electrode, a polarity of the arc current, a polarity of the current for welding wire, a parameter that affects an arc current of the welding operation, a type of electrode, a gauge of wire, a material of wire, and the like.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welder system, comprising:
    a welding power supply configured to provide an alternating current welding waveform to an electrode to create an arc between the electrode and a workpiece;
    a waveform generator that is configured to create the alternating current welding waveform with a waveform cycle having a first portion and a second portion, wherein the first portion includes a duration of time in a positive polarity and the second portion includes a duration of time in a negative polarity;
    a high speed diverter circuit that is configured to transition the alternating current welding waveform from the positive polarity to the negative polarity based upon maintaining a ratio between the duration of time in the positive polarity and the duration of time in the negative polarity;
    a magnetic field circuit that is configured to at least one of calculate or detect a magnetic field in the workpiece to determine a level of a magnetic field related to arc blow that impacts the arc between the electrode and the workpiece; and
    a controller that is configured to dynamically adjust during welding at least one of the waveform generator and the high speed diverter circuit to reduce the magnetic field based on the determined magnetic field level,
    wherein the dynamically adjusting includes adjusting at least one of the first portion, the second portion, an amplitude of the alternating current welding waveform, a frequency of the alternating current welding waveform, the ratio, the duration of time in the positive polarity for the first portion, or the duration of time in the negative polarity for the second portion, and
    wherein the high speed diverter circuit is further configured to transition the alternating current welding waveform from the positive polarity to the negative polarity based on the level of the determined magnetic field.

2. The welder system of claim 1, wherein the alternating current welding waveform is a square waveform having an amplitude and a frequency or a pulse waveform having an amplitude and a frequency.

3. The welder system of claim 1, wherein the duration of time in the positive pal y for the first portion of the alternating current welding waveform is greater than or equal to the duration of time in the negative polarity for the second portion of the alternating current welding waveform.

4. The welder system of claim 1, wherein the ratio between the duration of time in the positive polarity for the first portion to the duration of time in the negative polarity for the second portion is 50/50.

5. The welder system of claim 1, wherein the ratio between the duration of time in the positive polarity for the first portion to the duration of time in the negative polarity for the second portion is one of 60/40, 70/30, 80/20, or 90/10.

6. The welder system of claim 1, wherein the frequency of the alternating current welding waveform is within a range of 90 Hz to 115 Hz.

7. The welder system of claim 1, wherein the high speed diverter circuit is further configured to transition the alternating current welding waveform from the positive polarity to the negative polarity based upon a duration of time during welding which negates an amount of the magnetic field that builds up during the duration of time during welding.

8. The welder system of claim 1, wherein the high speed diverter circuit is further configured to transition the alternating current welding waveform from the positive polarity to the negative polarity based upon a length of a weld during welding which negates an amount of the magnetic field that builds up during the length of the weld.

9. The welder system of claim 1, the determined magnetic field level is calculated based on an estimated amount of magnetic field buildup related to arc blow in which the estimated amount is calculated based upon a material of the workpiece, a type of welding operation, a duration of time a weld is created, a length of performing a weld on the workpiece, and a type of electrode.

10. The welder system of claim 1, wherein the dynamically adjusting includes adjusting a current or a voltage of the alternating current welding waveform or a duration of time the current or the voltage is delivered for the alternating current welding waveform.

11. The welder system of claim 1, wherein the electrode is a flux cored electrode including at least a nickel alloy.

12. The welder system of claim 6, wherein the controller adjusts the frequency based upon at least one of a voltage or a current of the alternating current welding waveform.

13. The welding system of claim 1, wherein the magnetic field circuit uses a magnetic field sensor to determine the level of the magnetic field.

14. A method of welding, comprising:
creating an arc between an electrode and a workpiece;
delivering a welding wire to a puddle formed by the arc;
generating an alternating current welding waveform with a time ratio in which a duration of time in a positive polarity is equal to or greater than a duration of time in a negative polarity;
determining a level of a magnetic field related to arc blow that impacts the arc between the electrode and the workpiece by at least one of sensing or calculating a magnetic field in the workpiece;
dynamically adjusting at least one of an amplitude of the alternating current welding waveform, a frequency of the alternating current welding waveform, the time ratio, the duration of time in the positive polarity, or the duration of time in the negative polarity to reduce the magnetic field in the workpiece based on the determined magnetic field level; and
transitioning the alternating current welding waveform from the positive polarity to the negative polarity based on the level of the determined magnetic field.

15. The method of claim 14, wherein the electrode is a flux cored electrode including at least a nickel alloy.

16. The method of claim 14, wherein the waveform is a square waveform having an amplitude and a frequency or a pulse waveform having an amplitude and a frequency.

17. The method of claim 14, wherein the frequency of the alternating current welding waveform is within a range of 90 Hz to 115 Hz.

18. The method of claim 14, wherein the level of the magnetic field is sensed and the sensing done by a magnetic field sensor.

* * * * *